US010666583B2

(12) United States Patent
Yao et al.

(10) Patent No.: US 10,666,583 B2
(45) Date of Patent: May 26, 2020

(54) SYSTEM AND METHOD FOR VISUALLY UNDERSTANDING AND PROGRAMMING CONVERSATIONAL AGENTS OF ELECTRONIC DEVICES

(71) Applicant: Baidu USA LLC, Sunnyvale, CA (US)

(72) Inventors: Xuchen Yao, Seattle, WA (US); Guoguo Chen, Seattle, WA (US)

(73) Assignee: BAIDU USA LLC, Sunnyvale, CA (US)

( * ) Notice: Subject to any disclaimer, the term of this patent is extended or adjusted under 35 U.S.C. 154(b) by 216 days.

(21) Appl. No.: 15/823,271

(22) Filed: Nov. 27, 2017

(65) Prior Publication Data

US 2019/0166069 A1 May 30, 2019

(51) Int. Cl.
*G06F 17/27* (2006.01)
*G10L 15/22* (2006.01)
(Continued)

(52) U.S. Cl.
CPC ............ *H04L 51/02* (2013.01); *G06F 3/0486* (2013.01); *G06F 3/04817* (2013.01); *G06F 8/34* (2013.01);
(Continued)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755;
(Continued)

(56) References Cited

U.S. PATENT DOCUMENTS 7,174,370 B1 * 2/2007 Saini .................. G06F 8/36
709/220
8,170,901 B2 * 5/2012 Shukla .................. G06Q 10/06
705/7.27

(Continued)

OTHER PUBLICATIONS

Cletus Andoh, Node Red—Conversation, Aug. 3, 2017, Youtube, 5:39 minutes:seconds. (Year: 2017).*

(Continued)

*Primary Examiner* — Lamont M Spooner
(74) *Attorney, Agent, or Firm* — Womble Bond Dickinson (US) LLP

(57) ABSTRACT

Embodiments of the inventive system and methods are directed to a computer program that employs a drag-and-drop user interface for managing dialogue states, tracking dialogue context, understanding dialogue utterances, and managing dialogue sessions. Each dialogue element is defined in a "node" that can be dragged and dropped into a canvas of the user interface. An embodiment provides wiring mechanisms to freely link nodes. Dialogue utterances are contained in messages that flow through the wires linking different nodes until exiting the canvas to an end user. An executable image of a conversational agent is then generated by compiling the source code associated with the nodes based on their connections. A conversational agent can be deployed in an electronic device such as a home device, which configured to perform an action in response to a user verbal command or request using the conversational agent deployed therein.

22 Claims, 21 Drawing Sheets

(51) Int. Cl.
*H04L 12/58* (2006.01)
*G06F 3/0486* (2013.01)
*G06N 20/00* (2019.01)
*G06F 8/34* (2018.01)
*G06F 3/0481* (2013.01)
*G06F 40/30* (2020.01)
*G06F 40/35* (2020.01)
*G06F 40/56* (2020.01)
*G06F 40/216* (2020.01)
*G06F 40/295* (2020.01)

(52) U.S. Cl.
CPC .......... *G06F 40/216* (2020.01); *G06F 40/295* (2020.01); *G06F 40/30* (2020.01); *G06F 40/35* (2020.01); *G06F 40/56* (2020.01); *G06N 20/00* (2019.01)

(58) Field of Classification Search
CPC .. G06F 17/276; G06F 17/2765; G06F 17/277; G06F 17/2775; G06F 17/278; G06F 17/2785; G06F 17/2795; G10L 15/22
USPC .......................................... 704/1, 9, 251, 257
See application file for complete search history.

(56) References Cited

U.S. PATENT DOCUMENTS

| | | | | |
|---|---|---|---|---|
| 10,223,636 | B2* | 3/2019 | Reddy | G06N 5/025 |
| 2002/0032675 | A1* | 3/2002 | Williamowski | G06F 16/951 |
| 2004/0031019 | A1* | 2/2004 | Lamanna | G06F 11/3664 |
| | | | | 717/125 |
| 2004/0225920 | A1* | 11/2004 | Bates | G06F 11/362 |
| | | | | 714/38.13 |
| 2005/0165607 | A1* | 7/2005 | Di Fabbrizio | G06F 17/2785 |
| | | | | 704/256 |
| 2006/0129993 | A1* | 6/2006 | Belisario | G06F 11/362 |
| | | | | 717/124 |
| 2010/0049517 | A1* | 2/2010 | Huang | G06F 17/279 |
| | | | | 704/251 |
| 2010/0058220 | A1* | 3/2010 | Carpenter | G06Q 30/02 |
| | | | | 715/772 |
| 2012/0081371 | A1* | 4/2012 | Ozkaragoz | G06F 8/38 |
| | | | | 345/467 |
| 2012/0272217 | A1* | 10/2012 | Bates | G06F 11/362 |
| | | | | 717/125 |
| 2013/0268260 | A1* | 10/2013 | Lundberg | G06F 17/28 |
| | | | | 704/8 |
| 2014/0032471 | A1* | 1/2014 | Reddy | G10L 15/22 |
| | | | | 706/47 |
| 2014/0059518 | A1* | 2/2014 | Sierk | G06F 8/34 |
| | | | | 717/107 |
| 2014/0298106 | A1* | 10/2014 | Konigsburg | G06F 11/3636 |
| | | | | 714/38.13 |
| 2015/0121299 | A1* | 4/2015 | Snyder | G06F 3/0481 |
| | | | | 715/788 |
| 2016/0260029 | A1* | 9/2016 | Gelfenbeyn | G06N 5/022 |
| 2018/0052664 | A1* | 2/2018 | Zhang | G06F 8/34 |
| 2018/0053119 | A1* | 2/2018 | Zeng | G06N 3/006 |
| 2018/0054464 | A1* | 2/2018 | Zhang | H04L 51/04 |
| 2018/0054523 | A1* | 2/2018 | Zhang | G06F 17/2785 |
| 2018/0121323 | A1* | 5/2018 | Tucker | G06F 11/3636 |
| 2018/0129484 | A1* | 5/2018 | Kannan | G06F 8/34 |
| 2018/0165061 | A1* | 6/2018 | Nicolich-Henkin | G06F 3/167 |
| 2018/0211663 | A1* | 7/2018 | Shin | G10L 15/1815 |
| 2018/0314490 | A1* | 11/2018 | Lee | G06F 3/167 |
| 2018/0316630 | A1* | 11/2018 | Jacobson | H04L 51/02 |
| 2018/0358006 | A1* | 12/2018 | McConnell | H04L 51/02 |
| 2019/0026647 | A1* | 1/2019 | Salisbury | G06N 20/00 |
| 2019/0034409 | A1* | 1/2019 | Curtis | G06F 17/2205 |
| 2019/0073197 | A1* | 3/2019 | Collins | G06F 8/34 |
| 2019/0102078 | A1* | 4/2019 | Bhatt | G06F 3/0482 |
| 2019/0103111 | A1* | 4/2019 | Tiwari | G06F 16/3329 |
| 2019/0124020 | A1* | 4/2019 | Bobbarjung | G06N 5/00 |
| 2019/0130905 | A1* | 5/2019 | Bilgory | G10L 15/1815 |
| 2019/0278694 | A1* | 9/2019 | Tucker | G06F 11/3624 |
| 2020/0004874 | A1* | 1/2020 | Gupta | G06F 16/3329 |

OTHER PUBLICATIONS

Sergio Gama, ChatBot: Integrating Watson Assistant to Facebook Messenger with Node-red and ChatFuel, Aug. 22, 2017, Youtube, 7:21 minutes:seconds. (Year: 2017).* iSpring, How to create conversation simulations with iSpring TalkMaster 8.3, May 9, 2016, YouTube, 41:03 minutes:seconds. (Year: 2016).*

* cited by examiner

| Intent 401 | Utterances 402 |
|---|---|
| Agree | "I agree", "yes", "of course", "yes I agree", "I think so" |
| ⋮ | ⋮ |

SYSTEM AND METHOD FOR VISUALLY UNDERSTANDING AND PROGRAMMING CONVERSATIONAL AGENTS OF ELECTRONIC DEVICES

TECHNICAL FIELD

Embodiments of the invention relate generally to electronic devices. More particularly, embodiments of the invention relate to programming conversational agents of electronic devices.

BACKGROUND

Programming a conversational agent to carry out multi-turn dialogues requires detailed planning and careful implementation. It is a three-stage refining process including drawing up a blueprint/diagram for the conversational flow, implementing the diagram, and testing and refining by repeating until it is satisfied. First two steps are difficult to keep in synchronization because they are implemented in two different places. An all-in-one solution is more desirable for rapid development.

Besides dialogue management, understanding utterances in every turn of dialogue is essential. It is also a refining process including defining intents/entities to be predicted in a dialogue, annotating training samples and train a prediction system, testing and evaluating performance, and refining by repeating these steps until it is satisfied. Such manual operations are time consuming and inefficient.

BRIEF DESCRIPTION OF THE DRAWINGS

Embodiments of the invention are illustrated by way of example and not limitation in the figures of the accompanying drawings in which like references indicate similar elements.

FIG. 4 is a block diagram illustrating an example of an intent mapping table according to one embodiment.

FIGS. 7A-7F are screenshots illustrating examples of graphical user interfaces for designing and training a natural language understanding node according to certain embodiments

DETAILED DESCRIPTION

Figure 1:
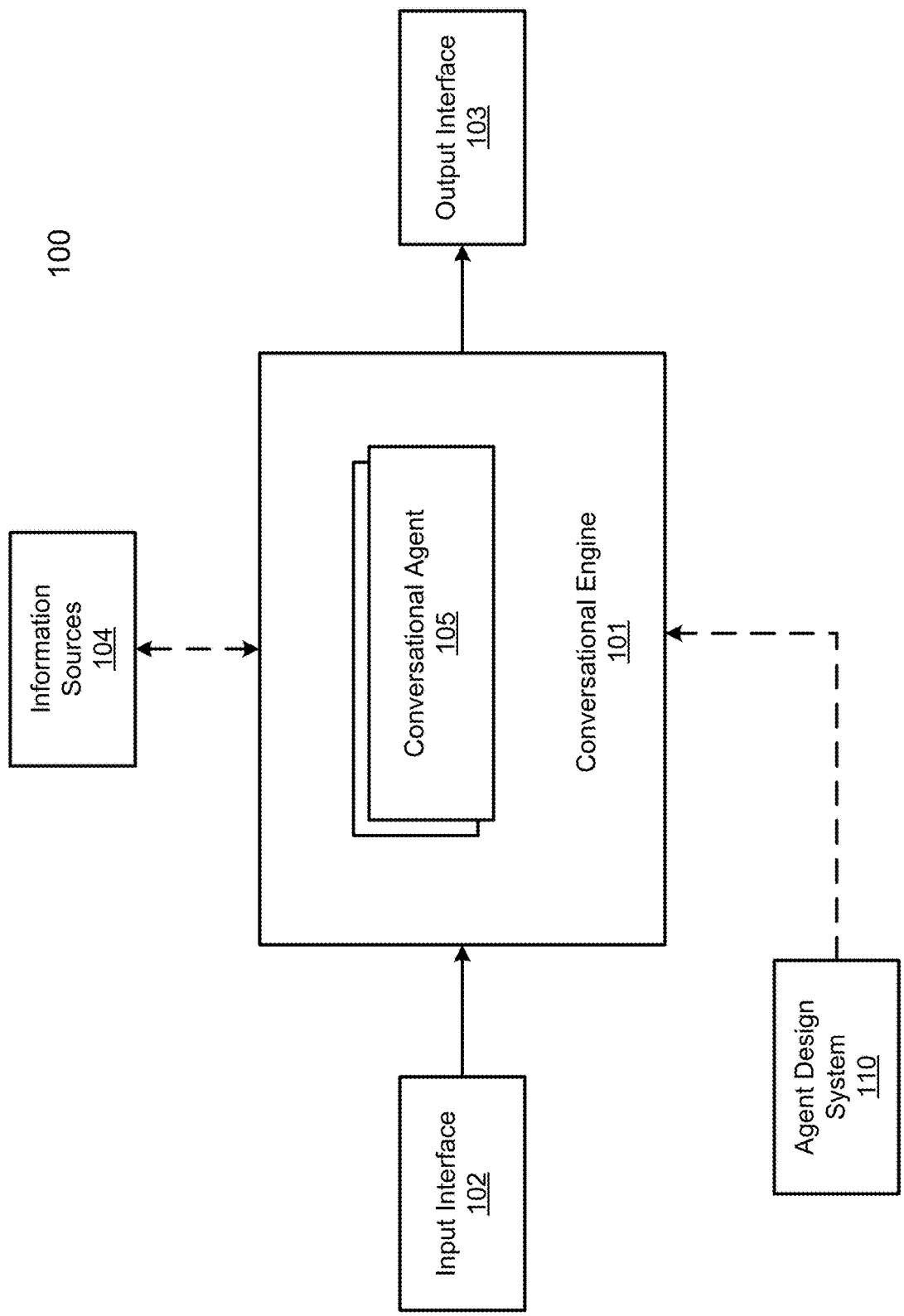
FIG. 1 is a block diagram illustrating an example of an electronic device having a conversational engine according to one embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the inventive system and methods are directed to a conversational agent design platform to design conversational agents, which employs a drag-and-drop user interface for managing dialogue states, tracking dialogue context, understanding dialogue utterances, and managing dialogue sessions. Each dialogue element is defined in a "node" that can be dragged and dropped into a canvas of the user interface. An embodiment provides wiring mechanisms to freely link nodes. Dialogue utterances are contained in messages that flow through the wires linking different nodes until exiting the canvas to an end user. An executable image of a conversational agent is then generated by compiling the source code associated with the nodes based on their connections. A conversational agent can be deployed in an electronic device such as a home device, which is configured to perform an action in response to a user's verbal commands or request using the conversational agent deployed therein.

In one embodiment, the system contains a specific natural language understanding (NLU) node that does natural language understanding of dialogue utterances. The NLU node outputs a dialogue intent and extracts one or more dialogue entities from input utterances. It then outputs extracted intent and entities through a wire linked to next nodes. The NLU system provides an intuitive annotation interface that one can use mouse clicking to select and label entities in utterances. Then it applies interactive machine learning to train a prediction system.

According to one embodiment, a graphical user interface is provided to allow a user to design a conversational agent by dragging and dropping dialogue elements, referred to herein as nodes, into a canvas of the user interface. The user can freely connect the nodes thereby creating a conversational flow of the conversational agent. A conversational agent includes an input node to receive input utterances from an input interface of an electronic device, a router node to manage and route messages of the conversation, and an output node to emit output utterances and/or other content (e.g., images) to an output interface of the electronic device. The output utterances may be presented as a response to the input utterances, which represents a conversational loop between a user and the device.

In addition, the conversational agent includes one or more sequences of nodes that can be invoked by the router node to process the input utterances and to generate data representing the output utterances. Each sequence of nodes represents a processing flow of operations performed by each of the nodes in the sequence. Each sequence of nodes includes an enter node, one or more intermediate nodes (optional), and a state node. A user can visually connect an output of a node to an input of another node using interactive tools provided by the graphical user interface. In response to connecting an input node to a router node on the user interface, the system automatically configures the input node to send messages to the router node via a first application programming interface (API). Similarly, in response to connecting the router node to the output node, the system automatically configures the router node to send messages to the output node via a second API. Each of the nodes is preconfigured with source code to perform predefined operations associated with that particular node. An executable image of the conversational agent is generated by compiling the source code of the nodes based on their connections.

FIG. 1 is a block diagram illustrating an example of an electronic device having a conversational engine according to one embodiment. Referring to FIG. 1, device 100 may be any electronic device such as a mobile device, a home device, a laptop, or a desktop, etc. For example, device 100 be a home device or IoT (Internet of thing) device such as a Google Home device, Amazon Echo device. Electronic device 100 can also be any mobile device with a mobile application running therein (e.g., Apple Siri, Microsoft Cortana). In one embodiment, device 100 includes a conversational engine 101 therein, where conversational engine 101 may be loaded into a memory and executed by one or more processors (not shown) of electronic device 100.

In one embodiment, conversational engine 101 includes one or more conversational agents 105 deployed therein. Conversation agent 105 is configured to receive an input from input interface 102, for example, from a user. The input may contain an input phrase spoken by the user and received via an audio interface (e.g., microphone), which may be transcribed into a text phrase or sentence using a speech recognition process. Alternatively, the input may be received as a text format over a network, such as, for example, via an email, text, etc.

In response to the input phrase or utterances, one of the conversational agents 105 is selected to process the input phrase and to generate an output as a response to the input in a conversational manner with respect to the user. Thus, the input may represent an inquiry by a user and conversational agent 105 processes the inquiry and responds with an output as a response to the inquiry, which can be presented to the user via output interface 103. Output interface 103 may be coupled to an audio output interface (e.g., speaker) and/or a display interface that can be coupled to a display device to display content of the output (e.g., images).

In addition, conversational agent 105 may communicate with external information sources 104 over a network to obtain additional information to be a part of the output in response to the inquiry. For example, a user may say "what is the temperature?" and in response, conversational agent 105 may contact an external weather service as part of external sources 104 to obtain the current temperature. The obtained current temperature may be compiled as a part of the output to be transmitted to output interface 103, which can be presented to the user, for example, via a speaker. In another example, a user may say "show me a picture of a cat." In response, the conversational agent may access an external image search engine to search an image with a cat.

Conversational agents 105 can be designed and provisioned using agent design system 110. Design system 110 employs a drag-and-drop graphical user interface (GUI) for managing dialogue states, tracking dialogue context, understanding dialogue utterances, and managing dialogue sessions. Each dialogue element is defined in a "node" that can be dragged and dropped into a canvas of the user interface. An embodiment provides wiring mechanisms to freely link nodes. Dialogue utterances are contained in messages that flow through the wires linking different nodes until exiting the canvas to an end user. An executable image of a conversational agent is then generated by compiling the source code associated with the nodes based on their connections. A conversational agent can be deployed in an electronic device such as a home device or a mobile device, which is configured to perform an action in response to a user verbal command or request using the conversational agent deployed therein.

The system contains a specific natural language understanding (NLU) node that does natural language understanding of dialogue utterances. The NLU node outputs dialogue intent and extracts dialogue entities from input utterances. It then outputs extracted intent and entities through a wire linked to next nodes. The NLU system provides an intuitive annotation interface that one can use mouse clicking to select and label entities in utterances. Then it applies interactive machine learning to train a prediction system.

According to one embodiment, a graphical user interface is provided at design system 110 to allow a user to design a conversational agent by dragging and dropping dialogue elements, referred to as nodes, into a canvas of the user interface. The user can freely connect the nodes thereby creating a conversational flow of the conversational agent. A conversational agent includes an input node to receive input utterances from an input interface of an electronic device, a router node to manage and route messages of the conversation, and an output node to emit output utterances and/or other output content to an output interface of the electronic device. The output utterances may be presented as a response to the input utterances, which represents a conversational loop between a user and the device.

In addition, the conversational agent 105 includes one or more sequences of nodes that can be invoked by the router node to process the input utterances and to generate data representing the output utterances. Each sequence of nodes represents a processing flow of operations performed by each of the nodes in the sequence. Each sequence of nodes includes an enter node, one or more intermediate nodes (optional), and a state node. A user can visually connect an output of a node to an input of another node. In response to connecting an input node to a router node on the user interface, the system automatically configures the input node to send messages to the router node via an application programming interface (API). Similarly, in response to connecting the router node to the output node, the system automatically configures the router node to send messages to the output node via an API. Each of the nodes are preconfigured with source code to perform predefined operations associated with that particular node. An executable image of the conversational agent is generated by compiling the source code of the nodes based on their connections.

Figure 2:
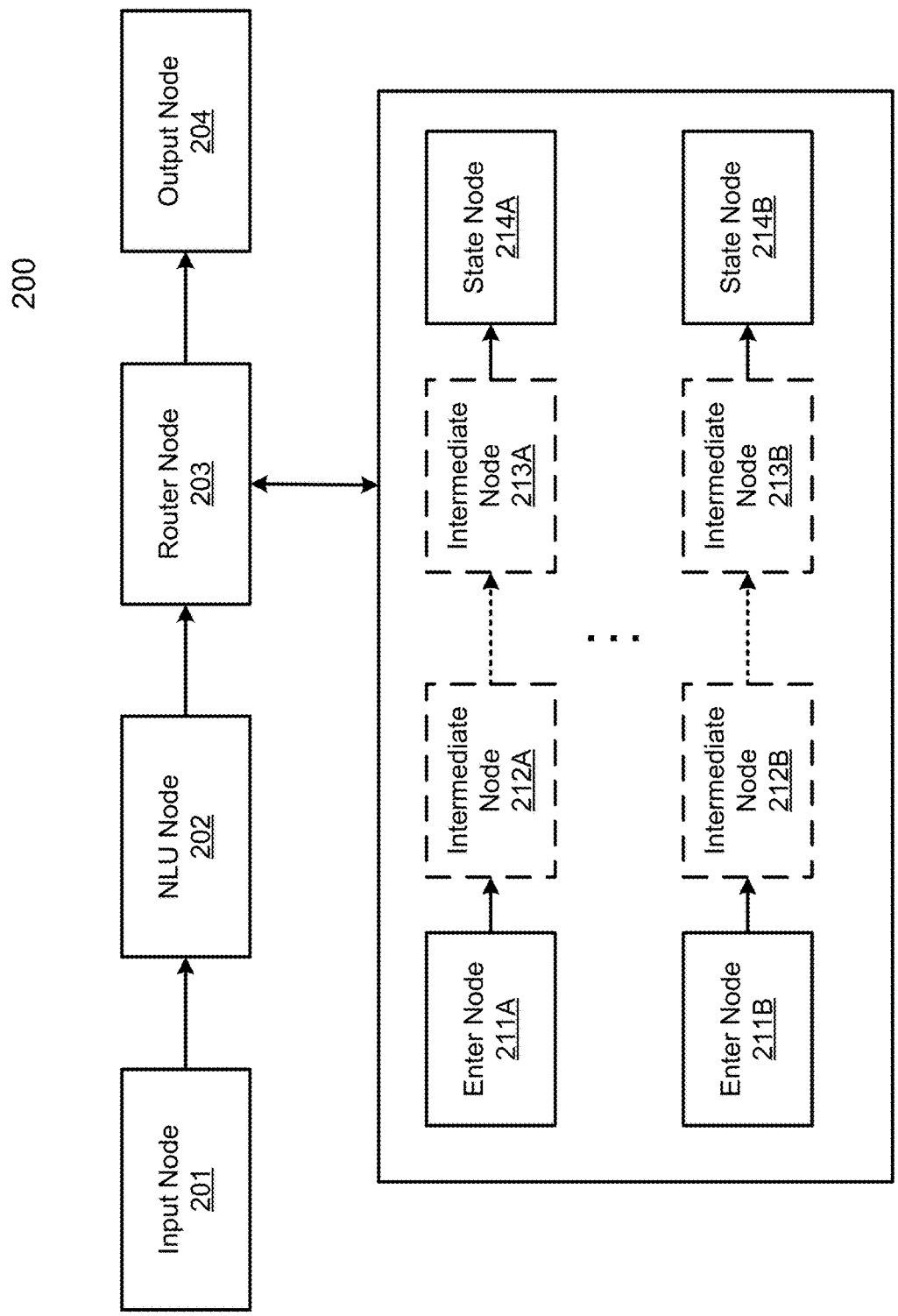
FIG. 2 is a block diagram illustrating an example of a conversational agent according to one embodiment.

FIG. 2 is a block diagram illustrating an example of a conversational agent according to one embodiment. Conversational agent 200 may represent any of conversational agents 105 of FIG. 1. Referring to FIG. 2, according to one embodiment, conversational agent 200 includes an input node 201, an NLU node 202 (optional), a router node 203 (also referred to as a dialogue manager or managing node), and an output node 204. In addition, conversational agent 200 includes one or more set of dialogue processing nodes. Each set of dialogue processing nodes includes an enter node (e.g., nodes 211A-211B), one or more intermediate nodes (e.g., nodes 212A-212B and 213A-213B), and a state node (e.g., nodes 214A-214B).

The conversational content is represented as nodes in a network or flow. Each node includes an input where it receives messages and an output where it sends messages. Execution of the flow (running the conversation) happens through the flow of messages among the nodes in the network. In a conversation, messages typically originate from input node 201. For example, Twilio In, Alexa In, and Cortana In nodes are available to create and send messages based on user input coming from SMS, Amazon Echo, or Microsoft Cortana. These input nodes do not receive messages from other nodes, so they do not accept incoming wires.

Once input node 201 receives a user input, it sends out a message through its output. The message created by input node 201 will contain a payload property that holds a string corresponding to the user's natural language input. Through the connection wire, this message typically goes to NLU node 202, which maps the natural language input into symbols (e.g., intent, entities) that drive the conversational interaction. The NLU results are added to the message as an NLU property. The message is then sent through a connection wire to router node 203.

The router node 203 then directs the message through a network of enter nodes (e.g., enter nodes 211A-211B, collectively referred to as enter nodes 211) and state nodes (e.g., state nodes 214A-214B, collectively referred to as state nodes 214). This process generates a system utterance, which router node 203 places in its outgoing message as a string in the payload property. The router node 203 then sends the message out through a wire, which is typically connected to output node 204 matching the input node 201 used (e.g., Twilio In to Twilio Out, Amazon In to Amazon Out). A node represents a function or subroutine that performs specific operations. A wire connecting an output of one node to an input of another node represents an API that is utilized for communications between two nodes.

Router node 203 is responsible for choosing what system of actions to perform during each conversational turn. The choices presented to the router are the enter nodes in the flow. The router will only consider enter nodes with entrance conditions that are satisfied at that point in the conversation. Once router node 203 receives a message, it selects one of the enter nodes 211. If none are eligible, the router sends out a message via an output wire. If an enter node receives a message from the router, it will pass that message through its own output wire. If the message reaches a state node with no output wires, for example, to another enter node, the state node sends its message back to router node 203. In other words, enter nodes 211 and state nodes 214 are the entry and exit points that router node 203 has to and from the author-defined conversational content. This conversational content consists of enter nodes 211, state nodes 214, and any other intermediate nodes 212-213 available in between. For example, it may include a weather service node as an intermediate node to access weather services provided by a remote weather service provider.

In each conversational turn, the system may use several enter nodes to build a system response. Once the router node 203 receives user input and the corresponding labeling from NLU node 202, router node 203 will prefer to choose an enter containing one or more entrance conditions with the goal of being responsive to user input. The router node 203 also remembers enter nodes it has evaluated in this dialogue turn. So an enter node is visited only once during each turn. This prevents the router from going to infinite loops.

Enter nodes 211 are the router's entry point into conversational content, which is typically a collection of networks, each bookended by an enter node (the entry point) and a state node (the exit point for the network). In between the enter node and the state node, there may be other intermediate nodes 212-213. All of the inter-node communication that happens between the enter node, which receives messages from the router, and the last state node, which sends messages back to the router, happen through wires representing the APIs between the nodes.

State nodes 214 update the conversational context and define the actions of the conversational agent including what it says to the user. Each state node includes a code editor where arbitrary executable code such as JavaScript code can be added. This code will run any time the state node receives a message. The entire message object can be accessed within the state node. In addition, state nodes include a field where a system utterance can be added. Whenever the state node receives a message, its utterance is added to the system's output to the user in the current conversational turn.

The two most basic uses of state nodes include adding system utterances to define what the system will present to the user and updating the user variables. All of the user variables persist throughout the entire interaction. Whenever an enter node receives a message, all of the user variables are available and these variables can be used in entrance conditions when router node 203 decides which of the enter nodes to select. State nodes include an attribute such as a checkbox that says Dialogue ends here. If that box is checked in a specific state node, whenever that state node is executed, the conversation ends. The state of the router is reset and all user variables are deleted.

Figure 3:
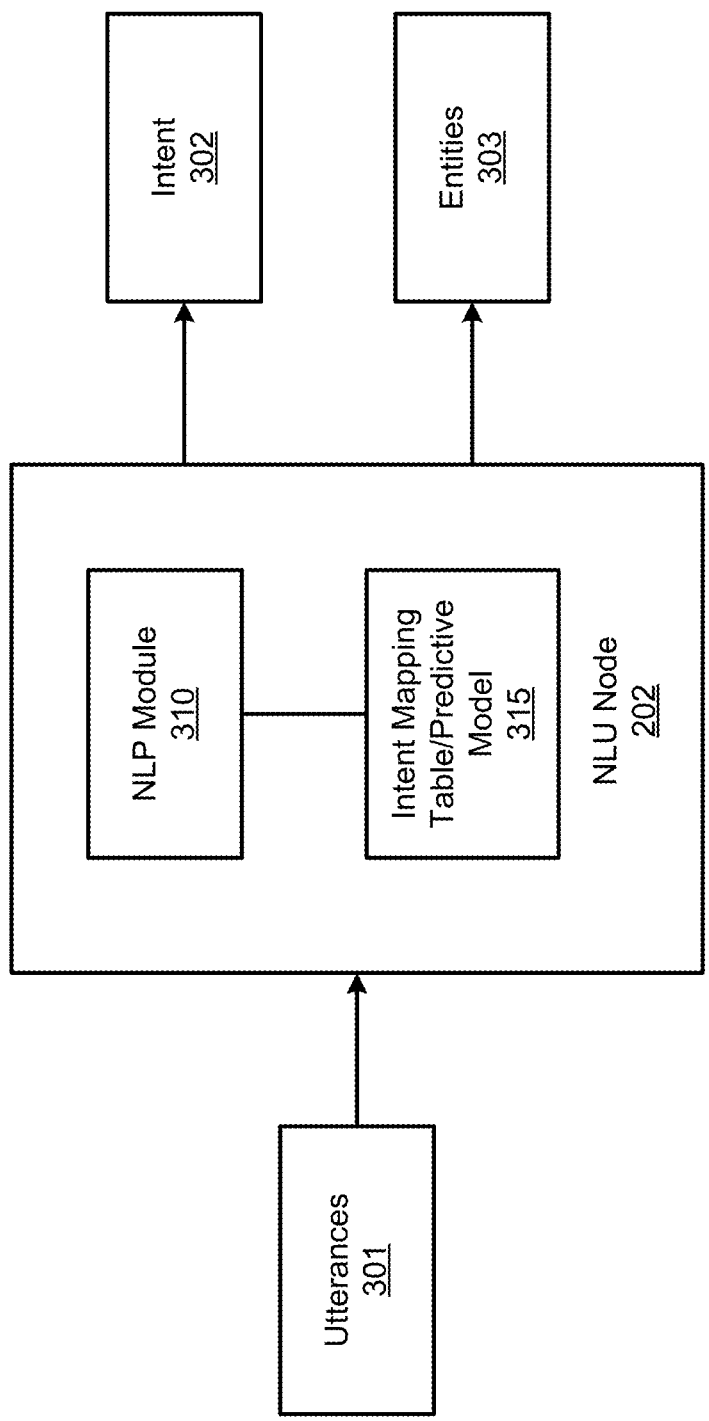
FIG. 3 is a block diagram illustrating an example of a natural language understanding node according to one embodiment.

NLU nodes, such as NLU node 202, are designed to map user utterances to a finite vocabulary of symbols. Two sets of symbols include the output of intents and entities, as shown in FIG. 3. Referring now to FIG. 3, NLU node 202 is configured to receive an utterance 301, to analyze utterance 301, and to determine intent 302 and one or more entities 303 using natural language processing (NLP). Specifically, according to one embodiment, NLU node 202 includes NLP module 310 to receive and analyze utterance 301. Utterance 301 may include a phrase or sentence spoken or provided by a user, such as a request for information or action to be performed.

In response to utterance 301, NLP module 310 performs an NLP operation on the utterance to determine an intent and to extract entities or features from the utterance that collectively represents user's intent and meaning. Natural language processing is a field of computer science, artificial intelligence and computational linguistics concerned with the interactions between computers and human (natural) languages, and, in particular, concerned with programming computers to fruitfully process large natural language corpora. Challenges in natural language processing frequently involve natural language understanding, natural language generation (frequently from formal, machine-readable logical forms), connecting language and machine perception, dialog systems, or some combination thereof.

Intents are utterance categories that capture the main communicative intent of the input utterance. For example, the intent "agreeing" captures the communicative intent of many utterances, such as "I agree", "yes", "of course", "yes, I agree", and "I think so too". The intent vocabulary or sample utterance used by NLU node 202 is defined by the content author and consists of an arbitrary number of arbitrary strings. These intents can be thought of as buckets in which each incoming input utterance will be placed by the NLU node.

In addition to one intent, each utterance may contain zero or more entities, which are sequences of words in the input utterance that correspond to a category defined by the content author. These categories, like intents, are of arbitrary number and labels. Common examples include locations, names of organizations, and prices. Consider, the following utterance: "Please make me a reservation for six people at Matsuhisa at 7 pm." The intent here may be make_restaurant_reservation, and the entities may be party_size (corresponding to the word "six"), restaurant_name (corresponding to the word "Matsuhisa") and time (corresponding to "7 pm"). Note that these assignments are made in the context of the current utterance.

In one embodiment, NLU node 202 maintains an intent mapping table or predictive model 315 to determine the intent of an utterance. When NLU node 202 receives utterance 301, NLP module 310 analyzes utterance 301 and extracts certain keywords from utterance 301. Based on the keywords, NLP module 310 searches in intent mapping table 315 or applies an intent predictive model to determine an intent associated with the keywords. An example of intent mapping table 315 is shown in FIG. 4. Referring now to FIG. 4, intent mapping table 400 includes a number of intent mapping entries. Each mapping entry maps a particular intent 401 to a list of keywords or utterances 402 that are associated with that particular intent. If a keyword obtained from utterance 301 matches any of the keywords in field 402 of a particular entry, the intent associated with the keyword can be determined and obtained from field 401 of the corresponding entry. Alternatively, the intent may be determined using a machine-learning intent predictive model. The intent predictive model may be trained using a large set of known data representing the intents of a majority of users given the specific situations such as the same or similar utterances.

Referring back to FIG. 2, input node 201 connects with conversational platforms, such as an Amazon Echo device, Facebook Messenger, Telegram, Kik, Twilio, Slack or Skype. It sends messages out through the wire to subsequent nodes for further processing. NLU node 202 accesses to a natural language understanding service to process the messages. Router node 203 is a node that manages the conversation and maintains its context. Messages received through the router node's input port typically contain user input or other external input. The router node 203, operating as a dialogue manager, is responsible for choosing which enter node will receive that message, among the enter nodes that contain only rules that pass based on the message. Output node 204 sends messages back to the sender to the input node 201.

In one embodiment, enter node 211 receives messages from the router node 203 (invisibly, without wires) and passes them through output wires if a set of conditions associated with enter node 211 are satisfied. Each enter node defines a set of rules to determine whether a message can pass. When a message arrives, the selected property or entity is evaluated against each of the defined rules. The message is then sent as output if all rules are satisfied. Although there can be multiple enter nodes with rules that all pass, the router node 203 will only send a message to one enter node at a time, so multiple enter nodes will not output the same message at the same time. The router node 203 chooses which enter node to send a message based on the enter node's rules (e.g., intent, entities). Different dialogue policies can be defined over which nodes are preferred if there are multiple enter nodes that with matching rules. For instance, nodes with more specific rules (equals, is true/false, is null, contains) are preferred over fewer specific rules (less/greater than, not null, etc.). State node 204 updates the context of the conversation, and optionally specifies text output. Typically state updates are in the form of computer code, which can be added to the node.

Between an enter node and a state node, there can be any number of other nodes to perform any functions on messages passed through wire. For instance, a function node can change message text. A web API node can request extra information on the web (e.g., accessing weather services, image search engine). There can be multiple instances of the chains of an enter node to a state node so that the dialogue can be expanded arbitrarily. All enter nodes and state nodes are managed by router node 203.

All nodes in FIG. 2 can be designed, configured, and deployed via an agent design system such as agent design system 110, which provides a user-friendly graphical user interface. During the design phase, the graphical user interface allows a user to drag and drop any node into the canvas of the user interface. The user can freely move the nodes around and connect any node with any node to establish a communication channel such as an API between the nodes. The underlying system will automatically generate at least a portion of source code representing at least a portion of functionalities of the nodes.

Figure 5:
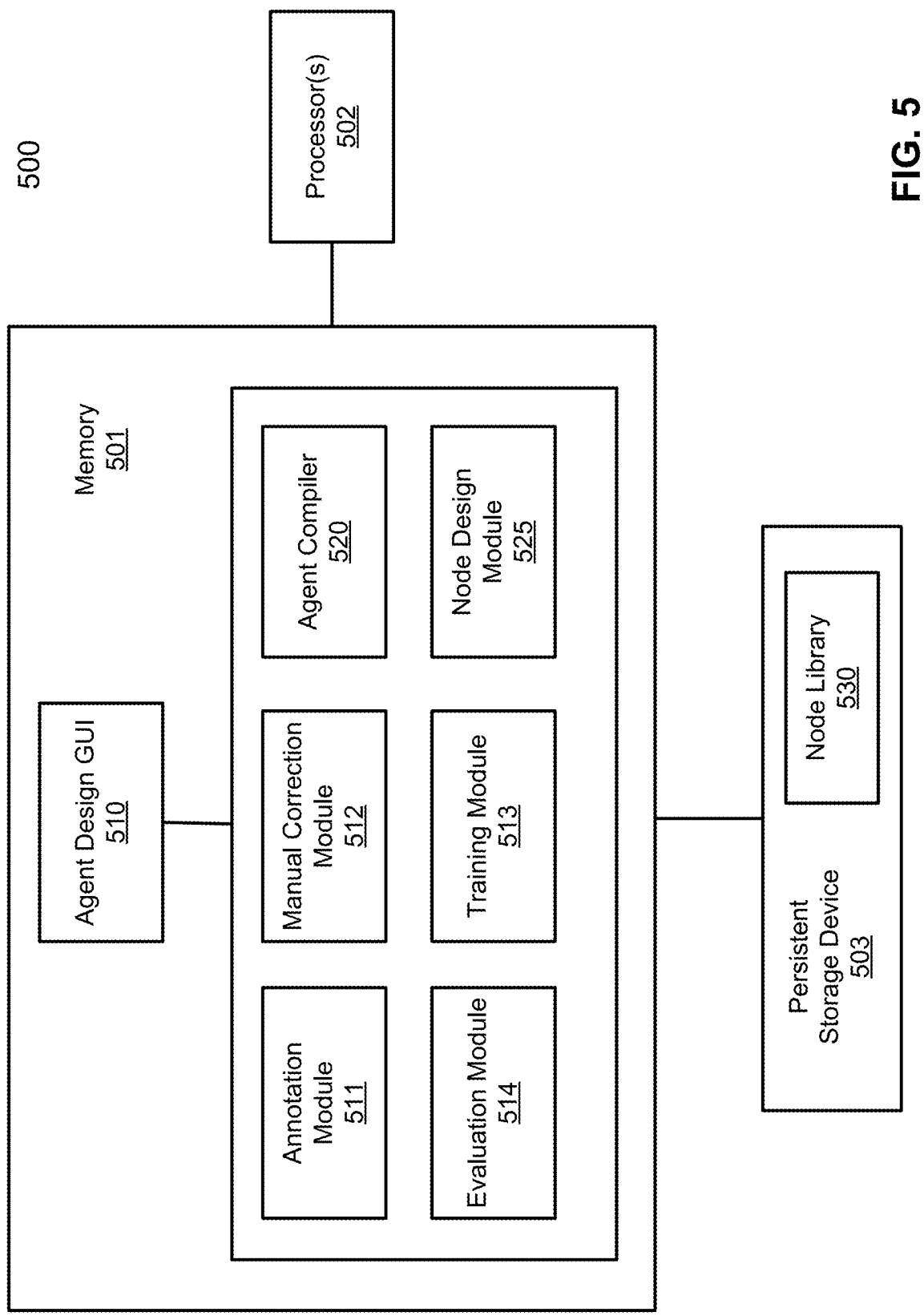
FIG. 5 is a block diagram illustrating an example of a conversational agent design system according to one embodiment.

FIG. 5 is a block diagram illustrating a conversational agent design system according to one embodiment of the invention. System 500 may represent agent design system 110 of FIG. 1. Referring to FIG. 5, agent design system 500 includes an agent design platform that can be loaded onto memory 501 and executed by one or more processors 502. The design platform includes annotation module 511, manual correction module 512, evaluation module 514, training module 513, agent compiler 520, and node design module 525, which may be implemented in software, hardware, or a combination thereof. The agent design platform further includes agent graphical user interface 510, which can be displayed on a display device (not shown) and interact with a user such as an agent developer.

With design GUI 510, a user can drag and drop any one of the preconfigured nodes from node library 530 from persistent storage device 503 into a design canvas of GUI 510 and visually connect the nodes. For example, a user can use a pointing device such as a mouse or cursor to draw a wire or link to connect an output port of the first node to an input port of the second node on design GUI 510. A connection between an output of a first node and an input of a second node represents a relationship between the first node and second node. In one embodiment, each of the configured nodes is associated with or contains preconfigured source code (e.g., source code templates) that has been configured to perform one or more predefined operations.

When a user connects an output port of the first node to an input port of the second node, the underlying system such as agent compiler 520 and/or node design module 525 automatically generate additional source code to establish a communication between the first node and second node. For example, node design module 525 may generate a call via an appropriate API to send messages from the first node to the second node, in response to a user action visually connecting the output of the first node to the input of the second node. The user can also further edit the source code of any node for its specific application or additional functionalities of the corresponding nodes. The modification may be captured, processed, and saved by node design module 525, for example, as a part of conversational agents 535 stored in persistent storage device 503 (e.g., hard disks).

As described above, in some situation, a NLU node may be utilized to understand the utterances received from a user to determine an intent and to extract one or more entities or features from the utterances. In one embodiment, design platform 500 further includes an NLU system having annotation module 511, manual correction module 512, evaluation module 513, and training module 513.

When a new utterance comes in, annotation module 511 (also referred to as an intent determination module) will first automatically annotate the utterance. The automatic annotation operation includes intent classification and entity extraction. An intent is an utterance class that captures the main communicative intent of the input utterance. Entities are subunits of an utterance that contains key information such as keywords. With automatic automation presented to a human, one can apply further manual correction on top of that to save some repetitive work via manual correction module 512. Manual correction module 512 communicates with the user via GUI 510 to invoke the user to confirm and/or correct the annotation provided by annotation module 511. Then a prediction system or model can be trained via training module 513 and used to evaluate via evaluation module 514 all sentences annotated so far (e.g., percentage of confirmation or correctness). The improved system can be used to help annotate more utterances received by annotation module 511 subsequently. This is an iterative process until satisfying performance is reached.

Once the conversational agent has been configured via design GUI 510, an executable image of the conversational agent can be generated by compiling the source code of the nodes involved by agent compiler 510, which may be stored as a part of conversational agents 535. The conversational agent can then be deployed onto an electronic device such as electronic device 200 of FIG. 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6A:
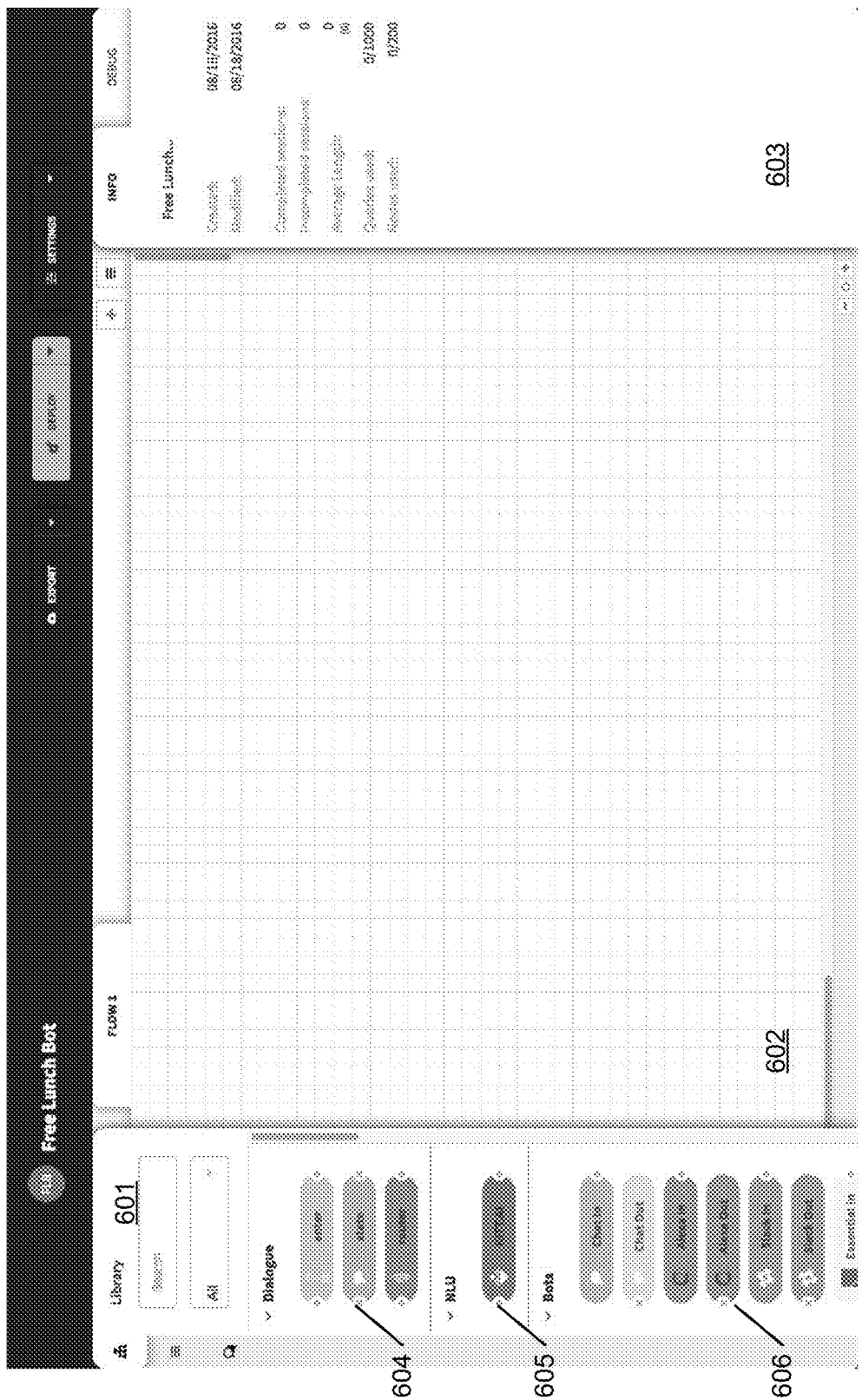
FIGS. 6A-6H are screenshots illustrating examples of graphical user interfaces for designing and configuring conversational agents according certain embodiments.

FIGS. 6A-6H are screenshots illustrating an example of graphical user interface for designing a conversational agent according to certain embodiments of the invention. The GUIs as shown in FIGS. 6A-6H may be presented by design GUI 510 of FIG. 5. Referring to FIG. 6A, the design GUI includes a node library section 601, a canvas design section 602, and information section 603. Library section 601 lists all the available nodes that have been preconfigured and available for usage. The node library section 601 includes a dialogue node section 604, an NLU section 605, and bots section 606. Note that sections 604-606 can be integrated or expanded into fewer or more sections. Dialogue node section 604 lists at least one enter node, a state node, and a router node. NLU section 605 includes at least one NLU node. Bots section 606 includes the input nodes and output nodes associated with a variety of different platforms to be deployed, such as, for example, Amazon Alexa, Slack, etc.

Figure 6B:
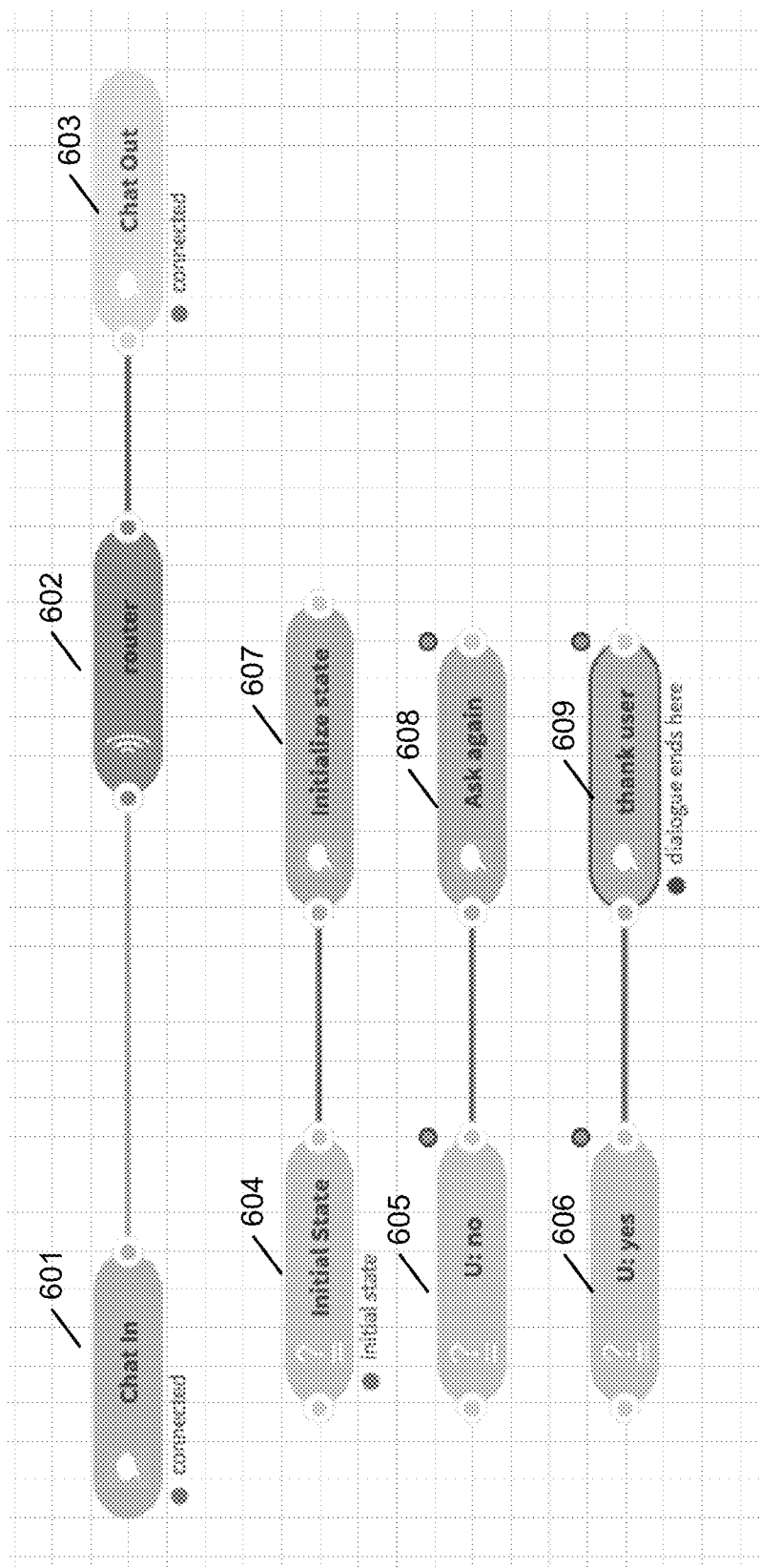

A user can select any of the nodes from node library section 601 into a design area, i.e., canvas 602, for example, by dragging and dropping the selected node or nodes into canvas 602 to provision or design a conversational agent, as shown in FIG. 6B. Referring now to FIG. 6B, in this example, assuming a user has dragged and dropped input node 601, router node 602, and output node 603 into the canvas. Input node 601 corresponds to a chat interface to receive utterances and output node is configured to send an output as a response to the utterances back to the chat interface, i.e., the sender of utterances. In addition, there are three pairs of enter nodes 604-606 and state nodes 607-609. Each of these nodes 604-609 can be selected from library section 601 of FIG. 6A by drag and drop operations.

Figure 6C:
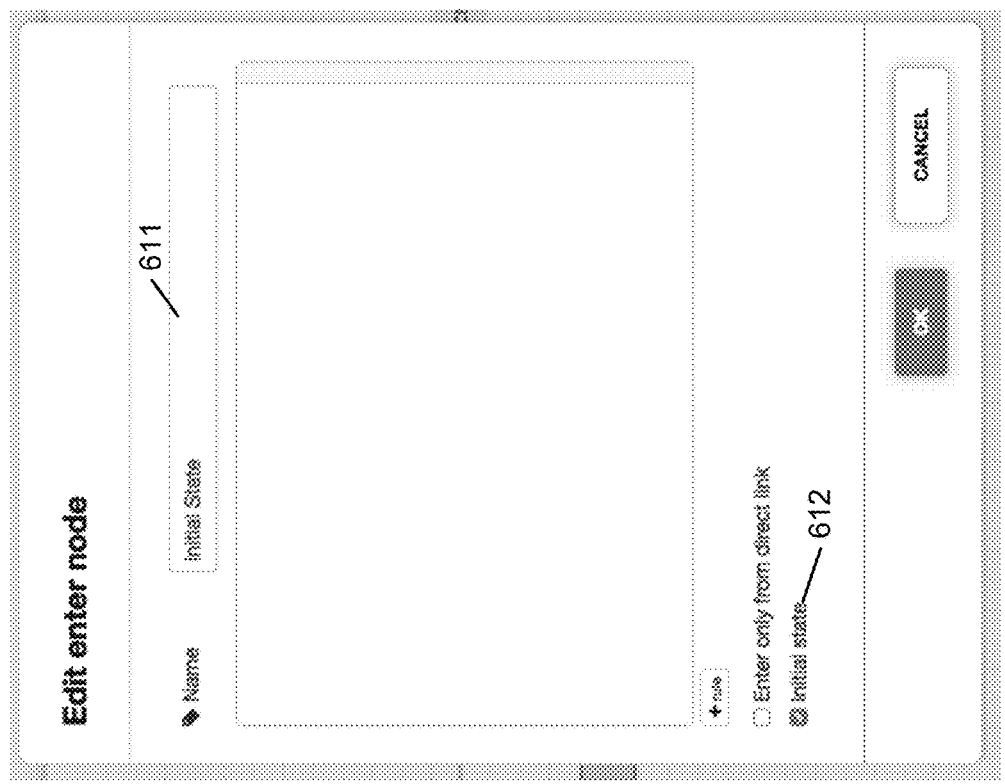

The user can edit the properties of each node, for example, by double clicking the graphical representation of the corresponding node, as shown in FIG. 6C. Referring now to FIG. 6C, FIG. 6C shows a GUI page to edit the property of node 604. The user can rename node 604 via field 611, in this example, "initial state." In addition, the user can specify that this node is an initial state by marking checkbox "Initial state" via field 612. By marking the node as an initial state, router node 602 is configure to invoke this node when the conversation agent starts.

Figure 6D:
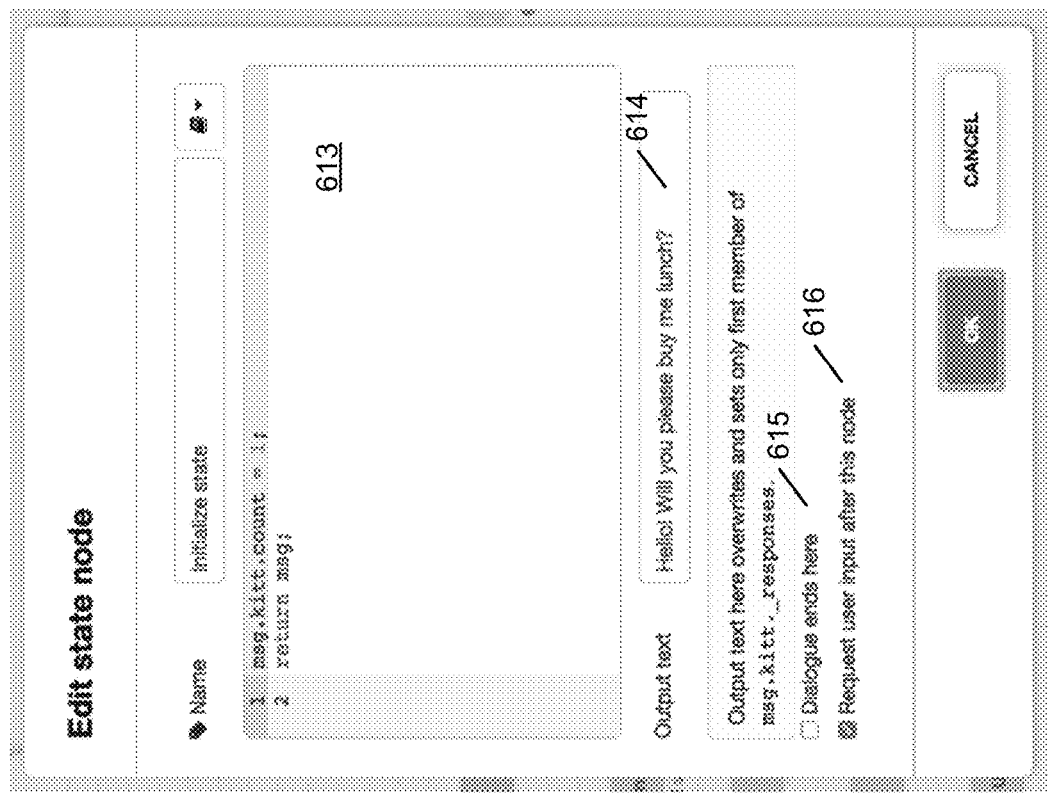

Similarly, the user can also edit state node 607 corresponding to enter node 604 as shown in FIG. 6D by double clicking node 607 from FIG. 6B. Referring now to FIG. 6D, the system automatically generates source code in field 613. In addition, the user can specify what information to be returned to the sender via field 614. When this state node is invoked by receiving a message from its corresponding enter node 604, the information will be obtained from field 614 and transmitted back to router node 602 and presented to the user via output node 603. Furthermore, the user can also specify whether this state node will end the conversation by marking checkbox 615. If checkbox 615 is selected, the conversation flow will end. Alternatively, the user can specify after this state node whether the user is requested to provide further input by marking checkbox 616. If checkbox 616 is marked, the system will wait for further user input without terminating the conversation session.

Figure 6E:
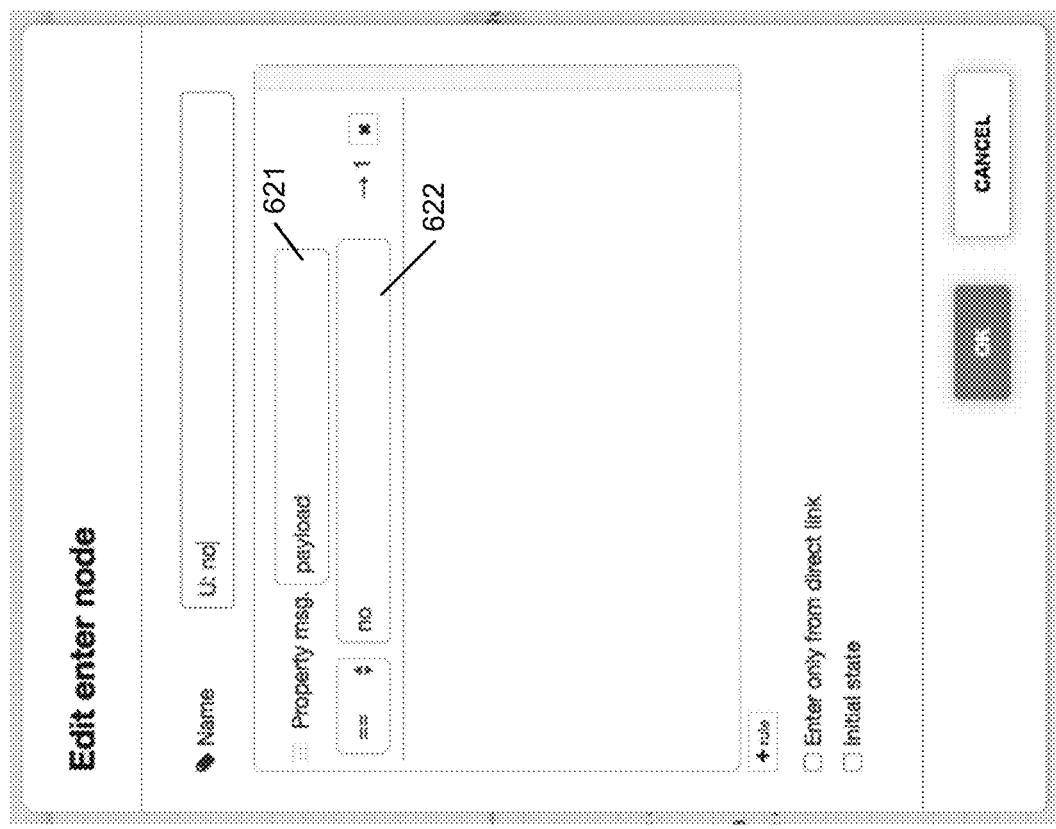
Figure 6F:
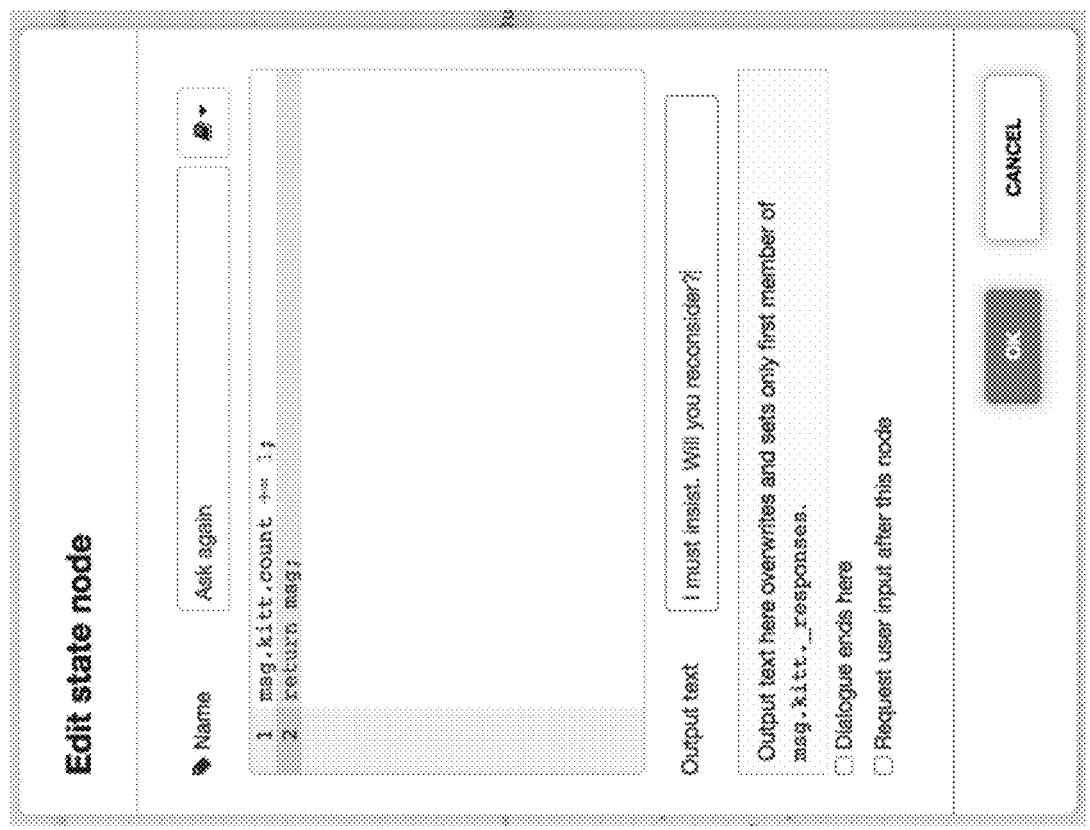

FIG. 6E shows a user interface to edit the properties of enter node 605 and FIG. 6F shows a user interface to edit the properties of state node 608. Referring to FIG. 6E, a user can specify one or more conditions that are utilized by router node 602 to determine whether enter node 605 should be invoked. In this example, the user specifies that if the payload of the message specified in field 621 equals to a string of "no" specified in field 622, enter node 605 will be selected. Thus for the example as shown in FIG. 6B, if the utterance received from input node 601 contains the payload of "no", router node 602 extracts the entities from the utterance and compares the entities with the conditions set forth in each of the enter nodes 604-606. In the example as shown in FIG. 6E, the condition of enter node 605 has been satisfied and thus, enter node 605 will be selected.

Figure 6G:
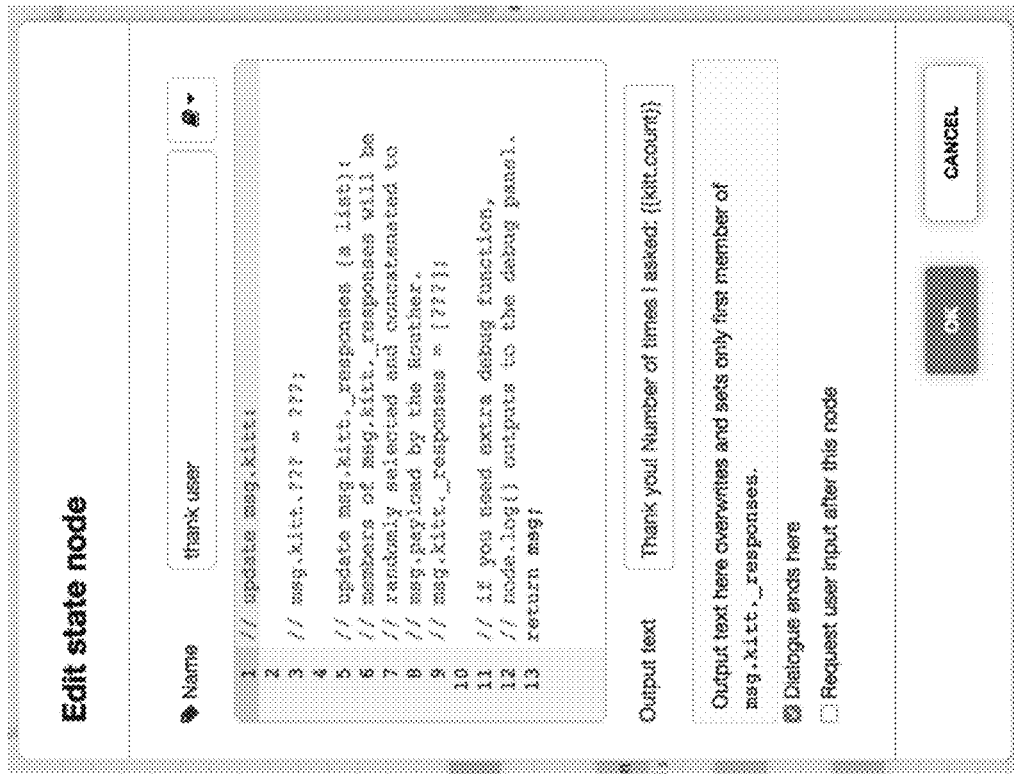
Figure 6H:
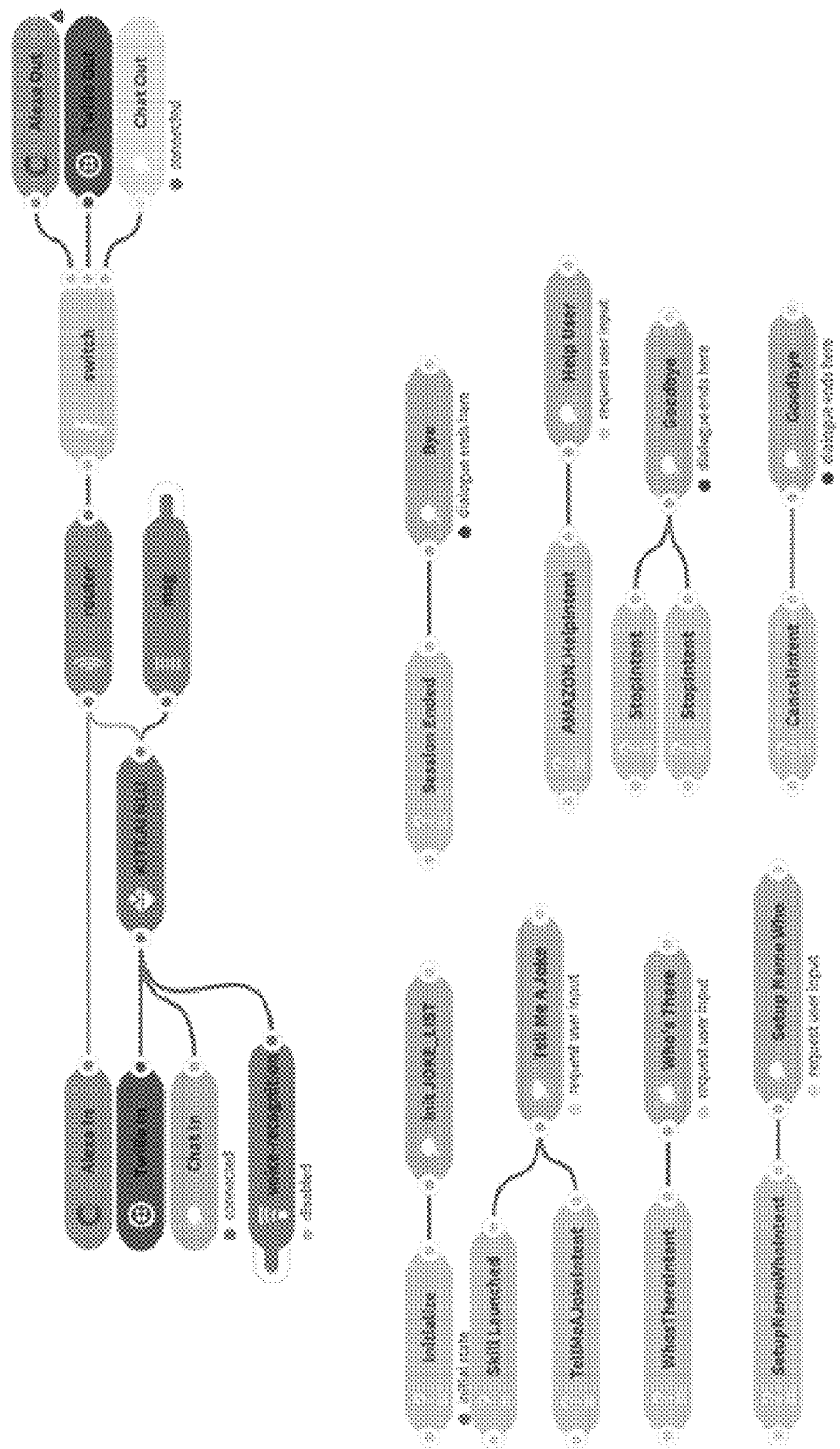

FIG. 6G shows a user interface to edit the properties of state node 609. As shown in FIG. 6G, the user can specify that this state node, when invoked, will end the conversation session by selecting attribute "dialogue ends here." Once the user clicks the OK button, all of the settings are saved, for example, by node design module 525 as a part of a conversational agent being designed. Note that an input of a node can be connected to outputs of multiple nodes. Similarly, an output of a node can be connected to inputs of multiple nodes as shown in FIG. 6H. In such situations, router node 602 is configured to compare the attributes or entities of the utterances against the conditions set forth in each of the downstream nodes to determine which of the downstream nodes should be selected.

Figure 7A:
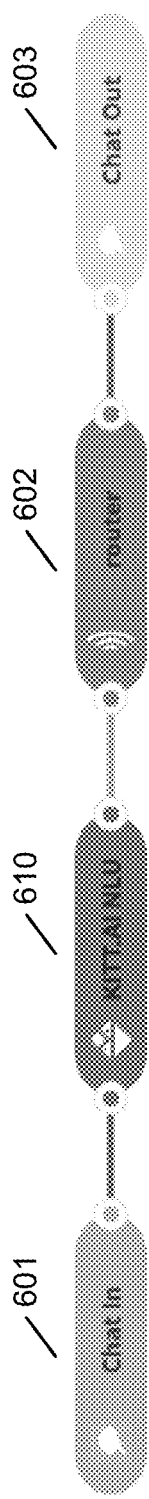

FIGS. 7A-7D are screenshots illustrating a graphical user interface for training a natural language understanding node according to one embodiment. Referring to FIG. 7A, as described above, between input node 601 and router node 602, there can be an NLU node 610 to determine an intent or category of utterances received from input node 601. As described above, NLU node 610 determines the intent of the utterances using natural language processing. NLU node 610 further extracts certain entities from the utterances. NLU node 610 can be trained using a training graphical user interface.

Figure 7B:
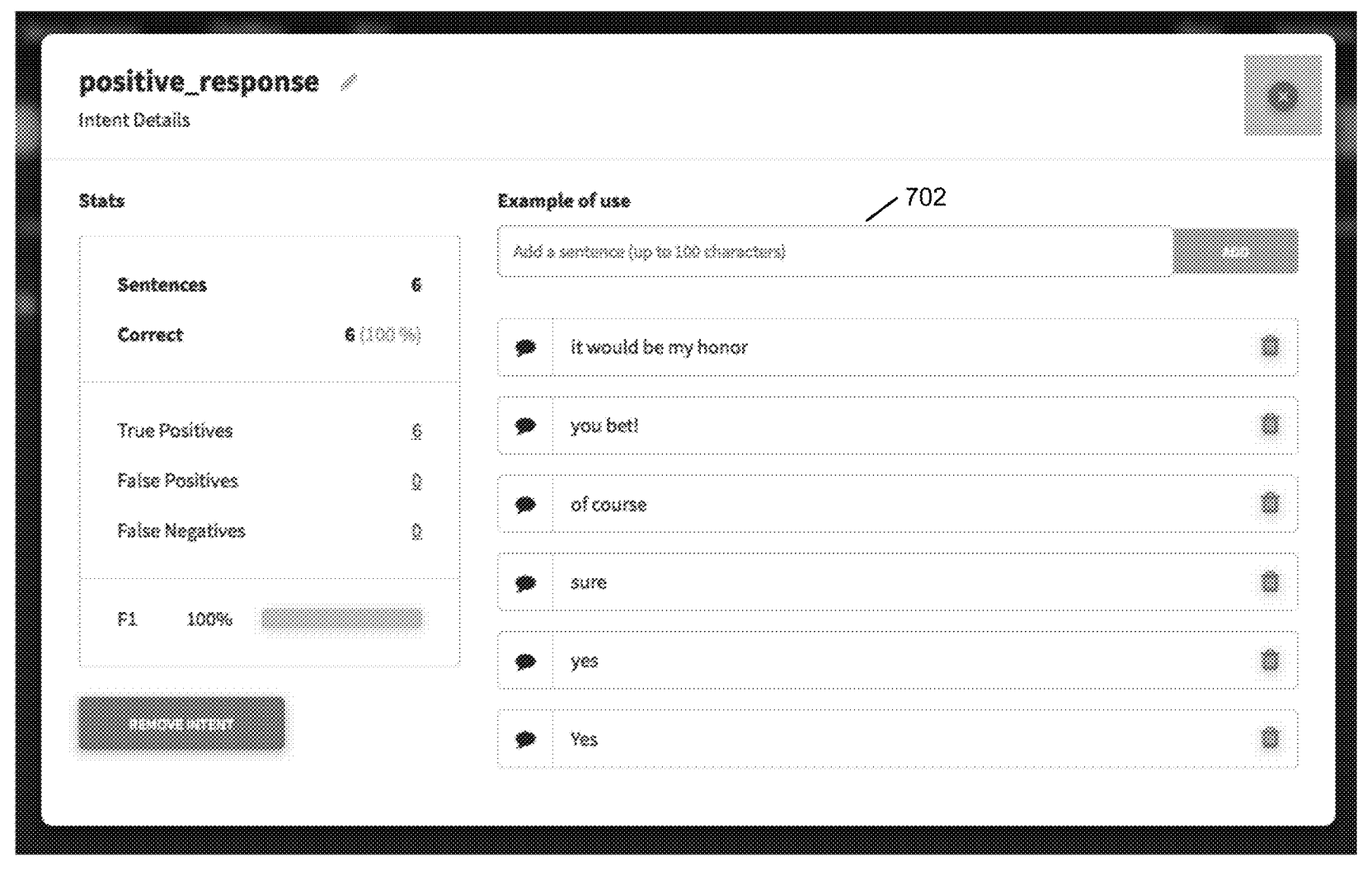
Figure 7C:
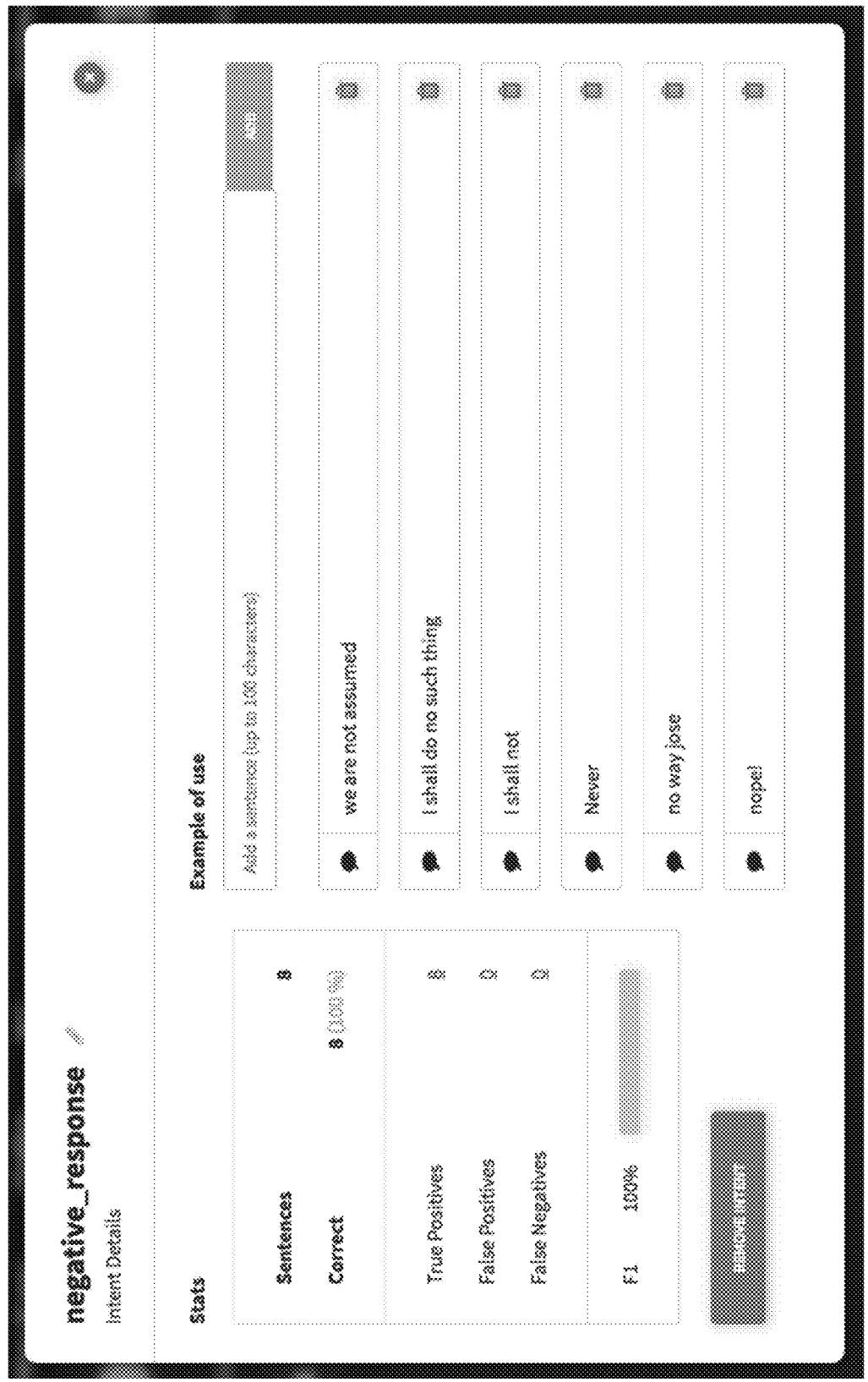
Figure 7D:
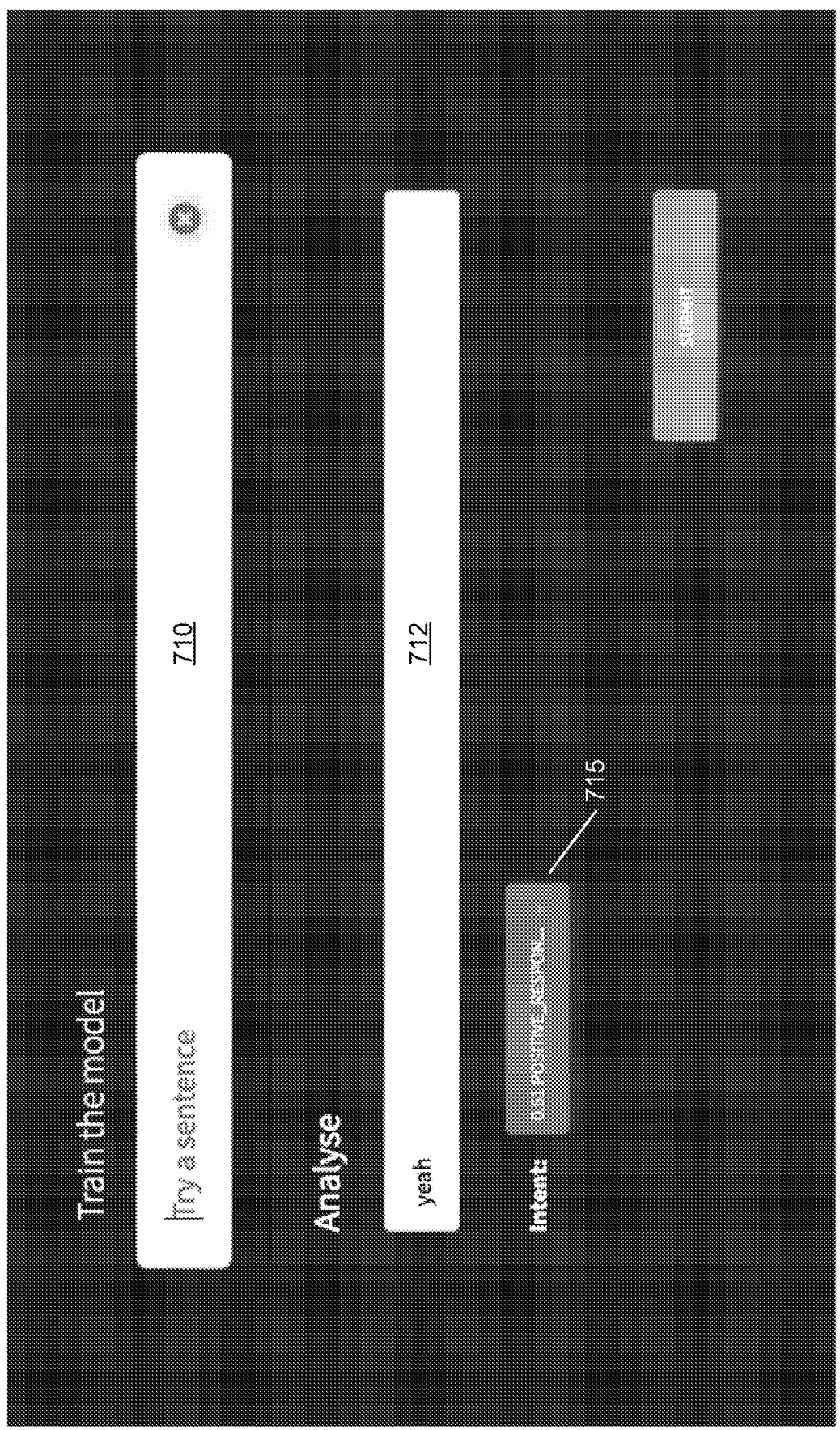

For example, as shown in FIG. 7B, a user can train a positive response intent by specifying a set of utterances via field 702 to specify that the listed utterances belong to the same categories, i.e., the positive response intent. Similarly, the user can specify a set of utterances associated with a negative response intent via the graphical user interface as shown in FIG. 7C. Once the NLU node has been configured, a user can test and train the NLU node using a graphical user interface as shown in FIG. 7D. Referring to FIG. 7D, for a particular NLU node, a user can enter any utterances in field 710 and the training system (e.g., annotation module 511) analyzes the utterances to determine an intent associated with the utterances and display the analysis result in field 712. The use can click button 715 to display a list of results. The user can then confirm the correct ones and/or remove the incorrect ones so that the system is trained. Based on the user interaction, the NLU node has been trained by training module 513 and the correction is iteratively evaluated by evaluation module 514 until the percentage of correct prediction of NLU node is above a predetermined threshold.

Figure 7E:
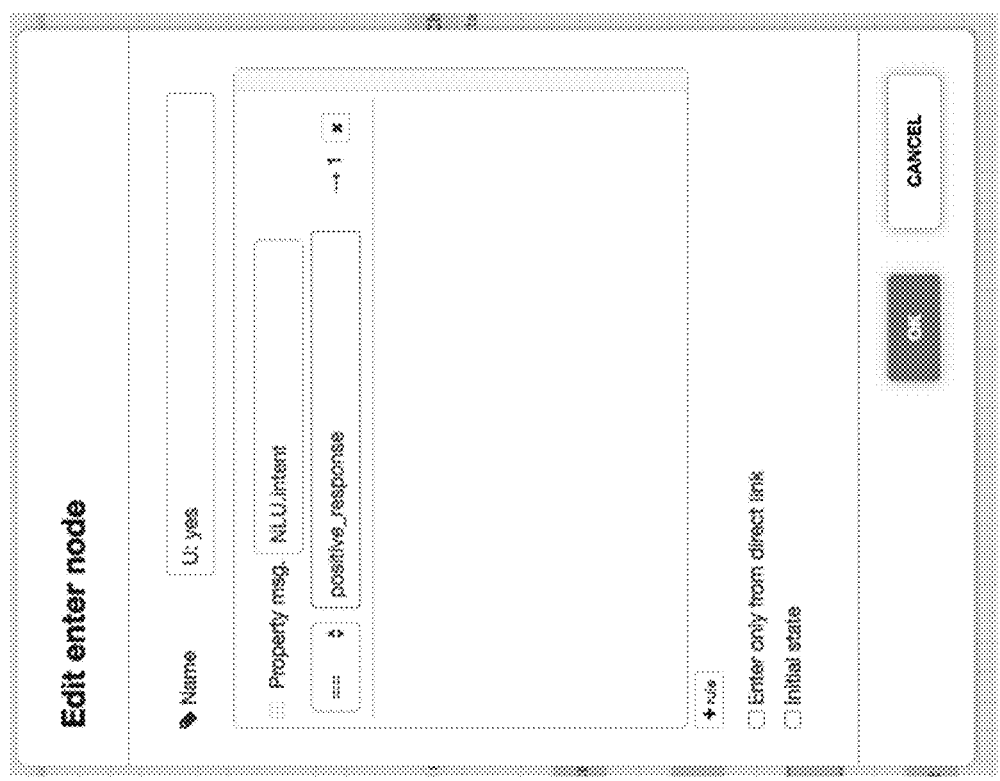
Figure 7F:
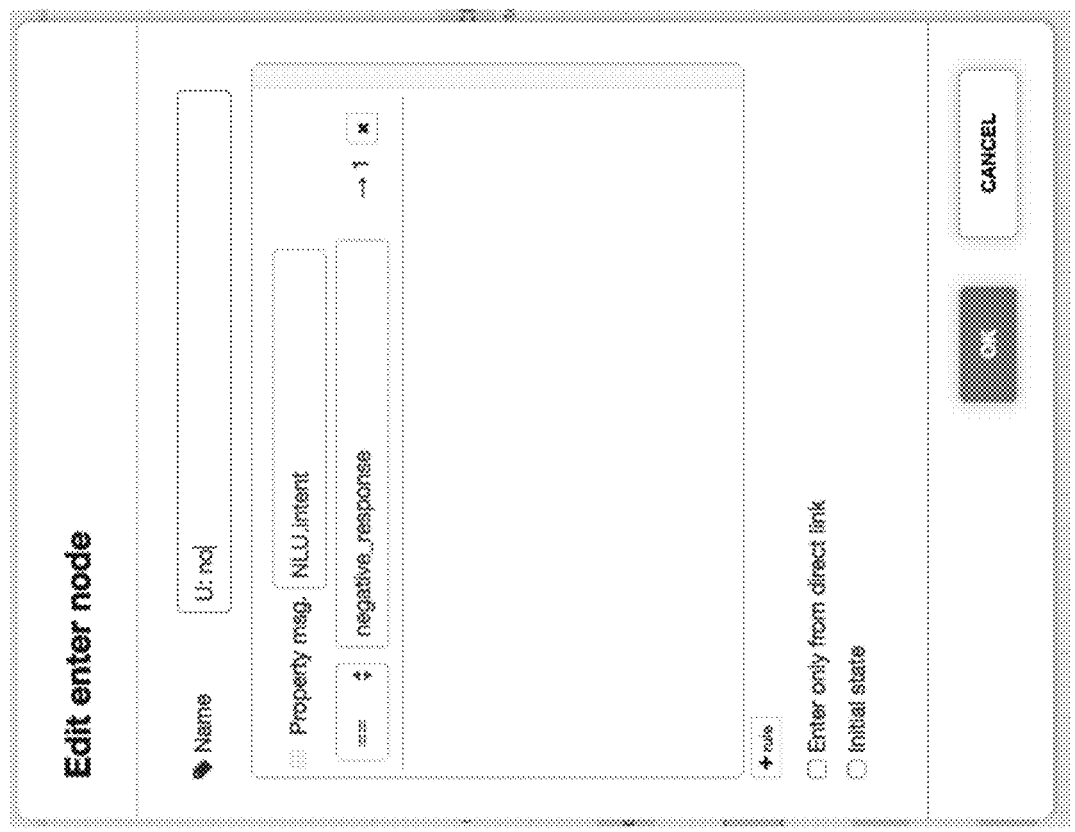

In order to utilize the output of NLU node 710, the properties of enter nodes 605-606 have to change as shown in FIGS. 7E and 7F. As shown in FIG. 7E, the condition is configured to match the intent property provided by NLU node 710, in this example, the positive response intent for enter node 606. Similarly, as shown in FIG. 7F, the condition for enter node 605 is negative response intent. Thus, at runtime, if the input contains any of the utterances as shown in FIG. 7B, NLU node 610 may determine an intent of positive response and enter node 606 may be invoked by router node 602. Similarly, when the input contains any of the utterances as shown in FIG. 7C, NLU node 610 may determine an intent of negative response and enter node 605 may be invoked by router node 602. The underlying operations of FIGS. 7A-7F are handled by modules 511-514 of FIG. 5.

Figure 8:
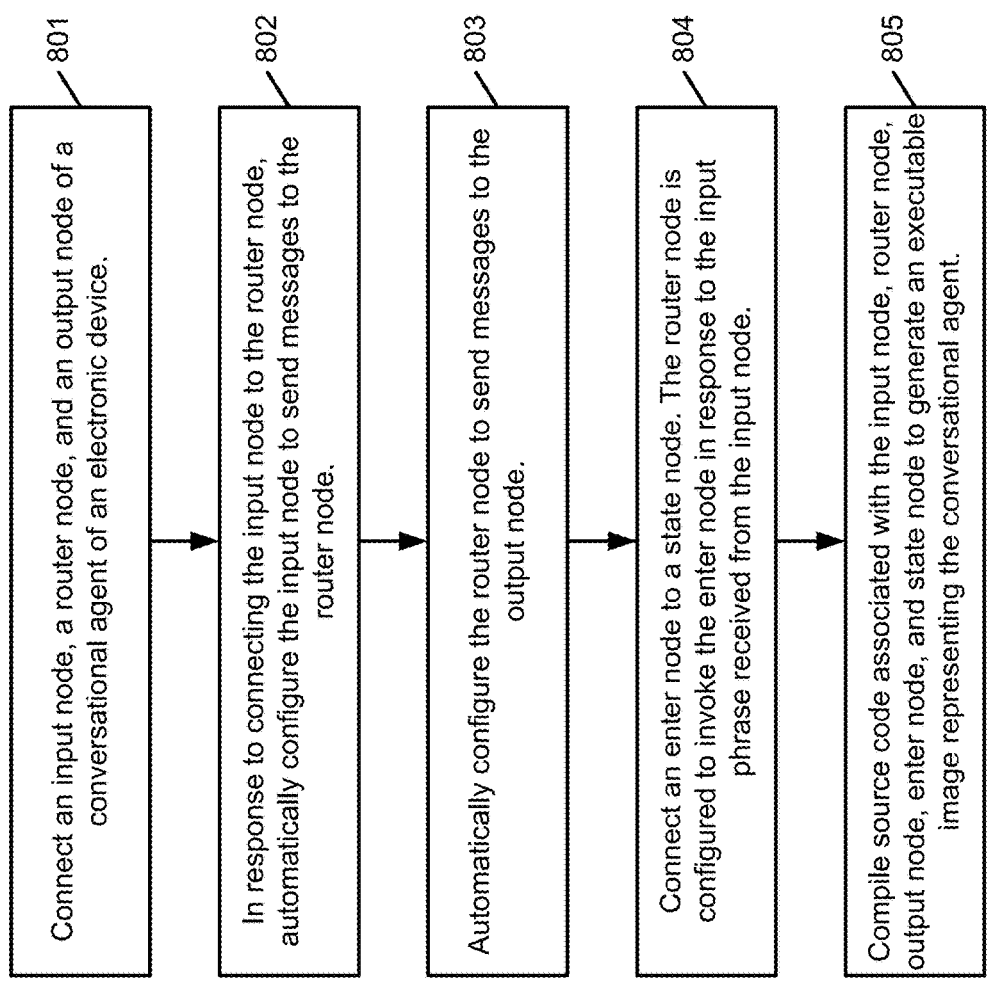
FIG. 8 is a flow diagram illustrating a process of designing a conversational agent according to one embodiment.

FIG. 8 is a flow diagram illustrating a process of designing and configuring a conversational agent according to one embodiment. Process 800 may be performed by processing logic which may include software, hardware, or a combination thereof. For example, process 800 may be performed by system 500 of FIG. 5. Referring to FIG. 8, in operation 801, processing logic connects an input node, a router node, and an output node of a conversational agent of an electronic device. The input node is to receive an input utterance from an input interface of the electronic device. The output node is to transmit an output utterance to an output interface of the electronic device as a response to the input utterance. In operation 802, in response to connecting the input node to the router node, processing logic automatically configures the input node to send messages to the router node. In operation 803, processing logic automatically configures the router node to send messages to the output node. In operation 804, processing logic connects an enter node to a state node. The router node is configured to invoke the enter node in response to the input phrase received from the input node, wherein the state node contains data to be transmitted back to the router node, which is utilized to generate the output utterance. In operation 805, processing logic compiles source code associated with the input node, router node, output node, enter node, and state node to generate an executable image representing the conversational agent.

Figure 9:
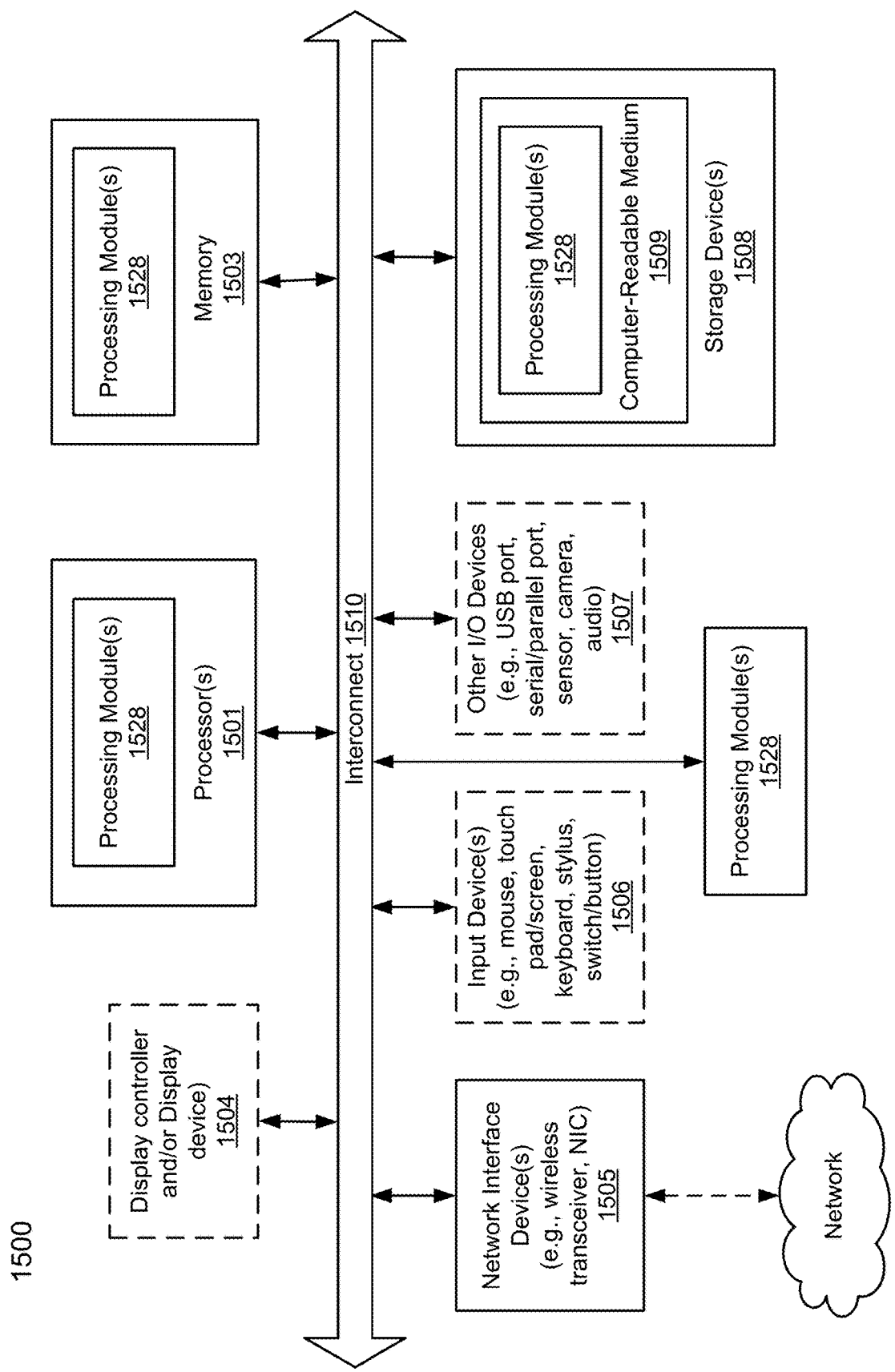
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, a client device or a server described above, such as, for example, system 200 of FIG. 2 or system 500 of FIG. 5, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, modules 511-514, agent compiler 520, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for configuring a conversational agent of an electronic device, the method comprising:

selecting, via a design interface from a node library, a plurality of nodes, including an input node, a router node, an output node, an enter node, and a state node, for use in a designing a conversational agent of an electronic device, where each of the plurality of nodes contains preconfigured source code to perform one or more operations;

connecting the input node, the router node, and the output node, wherein the input node is to receive an input utterance from an input interface of the electronic device, wherein the output node is to transmit an output utterance to an output interface of the electronic device as a response to the input utterance, wherein the router node is to manage dialogue context and session, and to route messages between the input node and the output node;

in response to connecting the input node to the router node, automatically configuring the input node to send messages to the router node;

automatically configuring the router node to send messages to the output node;

connecting the enter node to the state node, wherein the router node is configured to invoke the enter node in response to the input utterance received from the input node, wherein the state node contains data to be transmitted back to the router node, which is utilized to generate the output utterance;

generating, by an agent compiler, additional source code to implement communication between a first node of the plurality of nodes and a second node of the plurality of nodes in response to an output port of the first node being connected to an input port of the second node; and compiling the preconfigured source code associated with each of the plurality of nodes and the additional source code for the communication between the first node and the second node to generate an executable image representing the conversational agent.

2. The method of claim 1, further comprising:

presenting a first graphical representation representing the input node within a canvas of a user interface; and presenting a second graphical representation representing the router node within the canvas of the user interface, wherein connecting the input node and the router node is performed in response to a user action visually connecting an output of the input node to an input of the router node using a wire connection on the canvas.

3. The method of claim 1, further comprising providing a graphical user interface to allow a user to configure a set of one or more conditions for the enter node, wherein the enter node is invoked when the input utterance contains a feature that matches at least one of the conditions.

4. The method of claim 1, further comprising providing a graphical user interface to allow a user to configure information representing the output utterance for the state node.

5. The method of claim 1, further comprising connecting a natural language understanding (NLU) node between the input node and the router node, wherein the NLU node is configured to analyze the input utterance to determine an intent of the input utterance in order to invoke the enter node.

6. The method of claim 5, wherein the enter node is one of a plurality of pairs of enter nodes and state nodes, wherein the router node is configured to select the enter node based on the intent from the plurality of enter nodes.

7. The method of claim 5, further comprising providing a training interface to train the NLU node using a machine-learning engine, wherein the training interface allows a user to enter an utterance to be analyzed by the machine-learning engine to predict an intent associated with the utterance.

8. The method of claim 7, wherein the training interface further allows the user to provide feedback indicating whether the predicted intent is correct, and wherein the feedback is utilized to modify an operation of the NLU node to improve a prediction accuracy.

9. A non-transitory machine-readable medium having instructions stored therein, which when executed by a processor, cause the processor to perform operations, the operations comprising:
    selecting, via a design interface from a node library, a plurality of nodes, including an input node, a router node, an output node, an enter node, and a state node, for use in a designing a conversational agent of an electronic device, where each of the plurality of nodes contains preconfigured source code to perform one or more operations;
    connecting the input node, the router node, and the output node, wherein the input node is to receive an input utterance from an input interface of the electronic device, wherein the output node is to transmit an output utterance to an output interface of the electronic device as a response to the input utterance, wherein the router node is to manage dialogue context and session, and to route messages between the input node and the output node;
    in response to connecting the input node to the router node, automatically configuring the input node to send messages to the router node;
    automatically configuring the router node to send messages to the output node;
    connecting the enter node to the state node, wherein the router node is configured to invoke the enter node in response to the input utterance received from the input node, wherein the state node contains data to be transmitted back to the router node, which is utilized to generate the output utterance;
    generating, by an agent compiler, additional source code to implement communication between a first node of the plurality of nodes and a second node of the plurality of nodes in response to an output port of the first node being connected to an input port of the second node; and
    compiling the preconfigured source code associated with each of the plurality of nodes and the additional source code for the communication between the first node and the second node to generate an executable image representing the conversational agent.

10. The machine-readable medium of claim 9, wherein the operations further comprise:
    presenting a first graphical representation representing the input node within a canvas of a user interface; and
    presenting a second graphical representation representing the router node within the canvas of the user interface, wherein connecting the input node and the router node is performed in response to a user action visually connecting an output of the input node to an input of the router node using a wire connection on the canvas.

11. The machine-readable medium of claim 9, wherein the operations further comprise providing a graphical user interface to allow a user to configure a set of one or more conditions for the enter node, wherein the enter node is invoked when the input utterance contains a feature that matches at least one of the conditions.

12. The machine-readable medium of claim 9, wherein the operations further comprise providing a graphical user interface to allow a user to configure information representing the output utterance for the state node.

13. The machine-readable medium of claim 9, wherein the operations further comprise connecting a natural language understanding (NLU) node between the input node and the router node, wherein the NLU node is configured to analyze the input utterance to determine an intent of the input utterance in order to invoke the enter node.

14. The machine-readable medium of claim 13, wherein the enter node is one of a plurality of pairs of enter nodes and state nodes, wherein the router node is configured to select the enter node based on the intent from the plurality of enter nodes.

15. The machine-readable medium of claim 13, wherein the operations further comprise providing a training interface to train the NLU node using a machine-learning engine, wherein the training interface allows a user to enter an utterance to be analyzed by the machine-learning engine to predict an intent associated with the utterance.

16. The machine-readable medium of claim 15, wherein the training interface further allows the user to provide feedback indicating whether the predicted intent is correct, and wherein the feedback is utilized to modify an operation of the NLU node to improve a prediction accuracy.

17. A data processing system, comprising:
    a processor; and
    a memory coupled to the processor to store instructions, which when executed by the processor, cause the processor to perform operations, the operations including
        selecting, via a design interface from a node library, a plurality of nodes, including an input node, a router node, an output node, an enter node, and a state node, for use in a designing a conversational agent of an electronic device, where each of the plurality of nodes contains preconfigured source code to perform one or more operations,
        connecting the input node, the router node, and the output node, wherein the input node is to receive an input utterance from an input interface of the electronic device, wherein the output node is to transmit an output utterance to an output interface of the electronic device as a response to the input utterance, wherein the router node is to manage dialogue context and session, and to route messages between the input node and the output node,
        in response to connecting the input node to the router node, automatically configuring the input node to send messages to the router node;
        automatically configuring the router node to send messages to the output node,
        connecting the enter node to the state node, wherein the router node is configured to invoke the enter node in response to the input utterance received from the input node, wherein the state node contains data to be transmitted back to the router node, which is utilized to generate the output utterance,
        generating, by an agent compiler, additional source code to implement communication between a first node of the plurality of nodes and a second node of the plurality of nodes in response to an output port of the first node being connected to an input port of the second node, and
        compiling the preconfigured source code associated with each of the plurality of nodes and the additional source code for the communication between the first node and the second node to generate an executable image representing the conversational agent.

18. The system of claim 17, wherein the operations further comprise:
  presenting a first graphical representation representing the input node within a canvas of a user interface; and
  presenting a second graphical representation representing the router node within the canvas of the user interface, wherein connecting the input node and the router node is performed in response to a user action visually connecting an output of the input node to an input of the router node using a wire connection on the canvas.

19. The system of claim 17, wherein the operations further comprise providing a graphical user interface to allow a user to configure a set of one or more conditions for the enter node, wherein the enter node is invoked when the input utterance contains a feature that matches at least one of the conditions.

20. The system of claim 17, wherein the operations further comprise providing a graphical user interface to allow a user to configure information representing the output utterance for the state node.

21. The system of claim 17, wherein the operations further comprise connecting a natural language understanding (NLU) node between the input node and the router node, wherein the NLU node is configured to analyze the input utterance to determine an intent of the input utterance in order to invoke the enter node.

22. The system of claim 21, wherein the enter node is one of a plurality of pairs of enter nodes and state nodes, wherein the router node is configured to select the enter node based on the intent from the plurality of enter nodes.

* * * * *